(12) United States Patent
Courter et al.

(10) Patent No.: US 7,027,949 B2
(45) Date of Patent: Apr. 11, 2006

(54) SYSTEMS AND METHODS FOR MEASURING COMPONENT MATCHING

(75) Inventors: Kelly J. Courter, Tustin, CA (US); Joel E. Slenk, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/744,860

(22) Filed: Dec. 22, 2003

(65) Prior Publication Data

US 2005/0134425 A1 Jun. 23, 2005

(51) Int. Cl.
*G01B 11/24* (2006.01)

(52) U.S. Cl. .................. 702/167; 702/168; 702/127; 702/155

(58) Field of Classification Search ............... 702/168, 702/167, 155, 127
See application file for complete search history.

(56) References Cited

U.S. PATENT DOCUMENTS 5,375,397 A * 12/1994 Ferrand et al. ............... 54/66
6,546,813 B1 * 4/2003 Hubbard, Jr. ........... 73/862.041

* cited by examiner

*Primary Examiner*—John Barlow
*Assistant Examiner*—Stephen J. Cherry
(74) *Attorney, Agent, or Firm*—Black Lowe & Graham, PLLC

(57) ABSTRACT

Systems and methods for measuring a contour match between adjacent components are disclosed. In one embodiment, at least two pressure sensors are located between adjacent components. Each pressure sensor is adapted to obtain a pressure measurement at a location a predetermined distance away from the other pressure sensors, and to output a pressure measurement for each sensor location. An output device is adapted to receive the pressure measurements from at least two pressure sensors and display the pressure measurements. In one aspect, the pressure sensors include flexible thin film pressure sensors. In accordance with other aspects of the invention, a method is provided for measuring a contour match between two interfacing components including measuring at least one pressure applied to at least one sensor between the interfacing components.

13 Claims, 7 Drawing Sheets

SYSTEMS AND METHODS FOR MEASURING COMPONENT MATCHING

GOVERNMENT LICENSE RIGHTS

The invention described herein was made in the performance of work under subcontract No. 1970483303, NASA Prime Contract No. NAS 9-2000 and is subject to the provisions of Section 305 of the National Aeronautics and Space Act of 1958 (72 Stat. 435: 42 U.S.C. 2457).

FIELD OF THE INVENTION

This invention relates generally to measurement and, more specifically, to measuring component contours.

BACKGROUND OF THE INVENTION

During manufacturing and assembly work, component parts are commonly machined, ground, cast or otherwise manufactured with contours or shapes that match each other and are assembled together. For example, where parts are assembled using adhesives, matching contours between component parts may be important for obtaining good adhesion. Component parts assembled by other fastening means may be manufactured with closely matching contours for structural strength when assembled, or for sealing between the parts, with or without gaskets. By way of further example, thermal protection system tiles are shaped and glued to the outer shell of the space shuttle utilizing a heat tolerant adhesive. Matching the inner contour of the insulating tile to the shuttle shell permits the adhesive to yield a strong bond between the tile and the shuttle.

Measurement of contour matching between component parts has often utilized marking materials such as chalk, graphite, or carbon paper placed between the parts during test assembly. Alternately, soft materials may be applied to one part, the parts assembled, then separated, and the soft material checked for contact between the parts. Rocking of the component parts during testing with these methods may result in the apparent indication of a desired contour match when, in fact, one component part may bridge, or not match, the other component part. These methods also tend to yield qualitative rather than quantitative measurements of contour matching.

Accordingly there is an unmet need for contour matching systems and methods that can measure contour matching without susceptibility to rocking of the component parts during measurement and that yield quantitative measurements.

SUMMARY OF THE INVENTION

The present invention is directed to systems and methods for measuring a contour match between adjacent components. In one embodiment, at least two pressure sensors are located between adjacent components. Each pressure sensor is arranged to obtain a pressure measurement at a location a predetermined distance away from the other pressure sensor(s), and to output a pressure measurement for each sensor location. An output device is arranged to receive the pressure measurements from the at least two pressure sensors and display the pressure measurements. In another aspect of the invention, the pressure sensors include flexible thin film pressure sensors. In accordance with other aspects of the invention, a method is provided for measuring a contour match between two interfacing components including measuring a plurality of pressures applied to the pressure sensors between the interfacing components.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for measuring matching contours and shapes. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without several of the details described in the following description.

Figure 1:
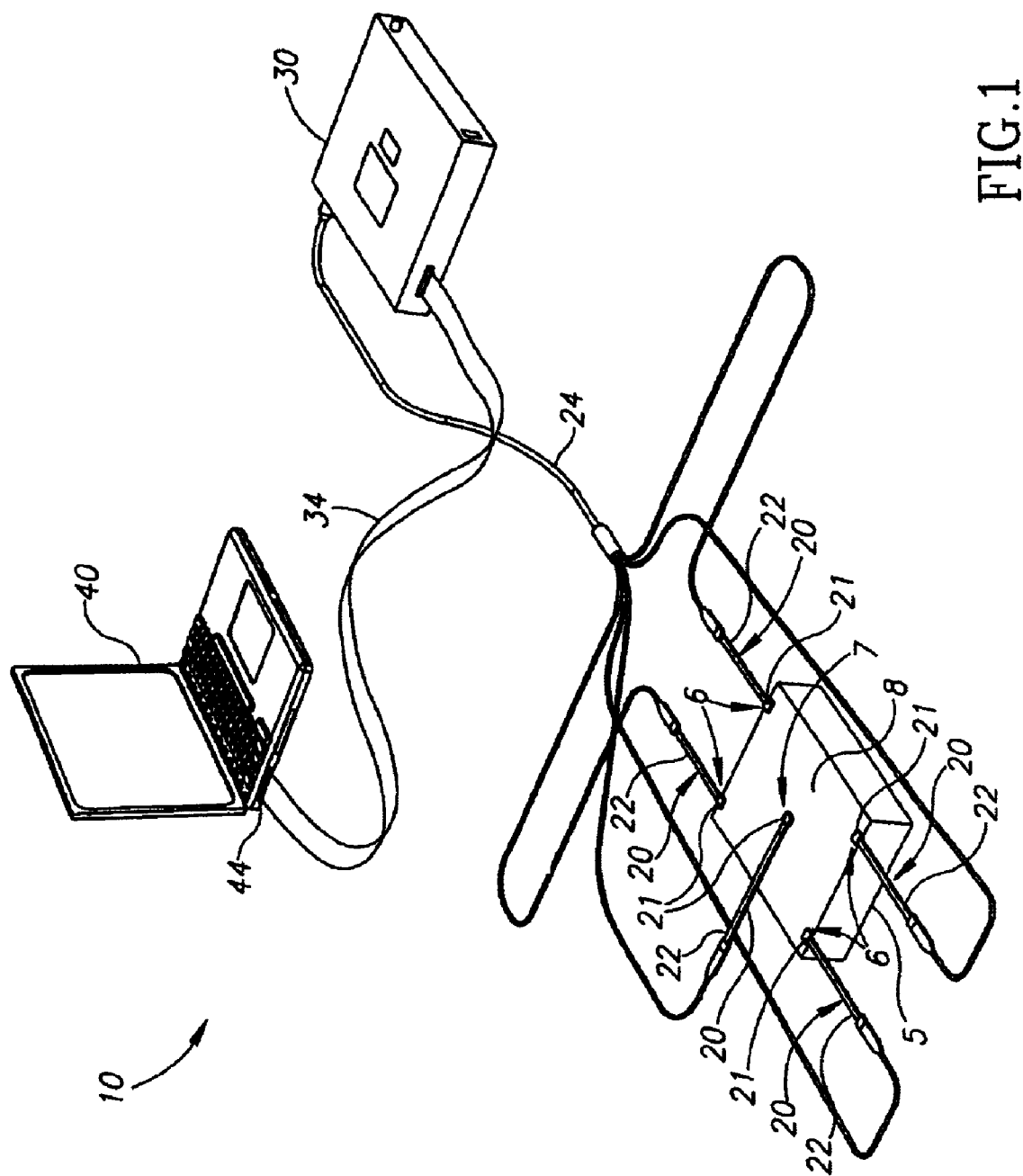
FIG. 1 is an isometric view of an exemplary sensor system in accordance with an embodiment of the present invention in place on a space shuttle thermal insulating tile.

FIG. 1 shows an exemplary contour match measuring system 10 in place on a space shuttle thermal protection system tile 5 in accordance with an embodiment of the present invention. In this example, the tile 5 is approximately 6 inch by 6 inches square and approximately 2 inches thick. An inner surface 8 to be adhered to the outer shell of the space shuttle (not shown) is shown facing upward with five pressure sensor units 20 installed on the tile 5. Each sensor unit 20 includes a pressure sensor 21 proximate an end portion thereof, and a flexible strip circuit link 22 connecting the sensor 21 to a wiring harness 24. In this embodiment, the five sensor units 20 are arranged on the inner surface 8 of the tile 5, by way of example, but not limitation, with four of the pressure sensors 21 located at the four corners 6 of the inner surface 8 of the tile 5, and with a fifth pressure sensor 21 arranged at the center 7 of the inner surface 8 of the tile 5. It will be appreciated that this configuration, with square tile, suitably arranges the pressure sensors on the inner surface 8 of the tile 5 in a pattern similar to the "5" on the face of a die from a pair of dice. The flexible links 22 are suitably thin and flexible permitting the tile 5 to be positioned in place against the outer skin of the shuttle, thereby permitting pressure measurements to be taken simultaneously at the corners 6 and the center 7 of the tile 5.

By way of example, but not limitation, the sensor units 22 suitably may include pressure sensitive ink pressure sensors 21 with thin plastic strip circuit links 22 encapsulating conductors leading to and from the pressure sensors 21. The conductors (not shown) in the circuit links 22 connect the pressure sensors 21 to an output device through the wiring harness 24. Pressure sensitive ink sensors with flexible circuit links suitably may include FLEXIFORCE® pressure sensors manufactured by TEKSCAN®, of Boston, Mass. The FLEXIFORCE® sensors, by way of example, but not limitation, are approximately 0.006" thick. The thin film flexible circuit links 22 permit the tile 5 to be held in place on the shuttle with the circuit links 22 maintaining an electrical connection with the pressure sensors 21 on the inside surface 8 of the tile while the circuit links 22 lead conductors (not visible) around the edges of the tile 5, even if the tile 5 is held in place between other tiles (not shown) for contour checking.

In measuring contour matches between component parts in other applications, the sensor units 20 permit a wide variety of patterns and surfaces to have pressure sensors 21 installed on them prior to test assembly. The adjoining component parts may then be assembled with their matching faces against each other to measure contour matching. As will be discussed further below, it will be appreciated that when the component parts are test assembled and held together, the contour match may be measured by comparing pressures from the different pressure sensors 21 arrayed over the mating surfaces of the component parts. A variation in pressure between individual pressure sensors 21 may indicate a poor contour match, or mis-positioning of the component parts. Alternately, if the component parts being tested are small, or if only a single area requires contour matching, a single pressure sensor 21 suitably may be used to measure the contour match by sensing the presence of or absence of a predetermined pressure at the single pressure sensor 21 location. The circuit links 22 connecting the one or more pressure sensors 21 to an output device may be any suitable length sufficient to run along the matching contour surface to a suitable exit point for connection to the output device, with or without an intervening wiring harness 24.

In the system 10, the sensor units 20 are suitably attached to a wiring harness 24. As will be more fully described with reference to FIG. 2 below, the pressure sensors 20 in this embodiment exhibit an electrical resistance that varies with applied pressure. Thus, a two-conductor connection (i.e. one for voltage in, and one for voltage out) suitably links each sensor to an output device. In this example, the wiring harness 24 includes 10 conductors (not shown), two for each of the five sensor units 20. In this exemplary system 10, the wiring harness 24 connects the sensor units 20 to a signal conditioner unit 30. The signal conditioner unit 30 suitably conditions and amplifies pressure-reading voltages from the sensor units 20, and outputs them through a cable 34 linked to a computer 40. In this example embodiment, the computer 40 is suitably a laptop personal computer with an analog-to-digital converter card 44.

The conditioner unit 30 in this example suitably includes a 6-channel signal conditioner and pre-amplifier (not shown). Five of the six channels amplify the voltages across the pressure sensitive ink pressure sensors 21, while the sixth channel amplifies a base excitation voltage being sent to the pressure sensors 21 through the wiring harness 24. Measuring the base excitation voltage suitably permits checking that low-pressure readings are not resulting from low input voltages to the pressure sensors 21. The conditioner 30 then outputs six separate analog voltages to the analog-to-digital converter 44 in the computer 40. In this example embodiment, the computer 40 operates software suitable to display the received voltages, and may convert them, as desired, into a pressure display, and/or "go/no go" contour matching indicators.

It will be appreciated that the output device for this system 10 may be other than a computer 40. By way of example, but not limitation, the output may be through separate voltage displays, or may utilize a pre-wired output circuit with lights indicating different pressures, or predetermined pressures.

Returning to the configuration of the pressure sensors 21 on the tile 5, it will be appreciated that a pre-determined level of contour match between the tile 5 and the shuttle shell or outer skin will produce a predetermined range of pressures on the pressure sensors 21 when tile 5 is held against the underlying curved outer shell of the shuttle. If a contour mismatch (i.e. voids, non-matching shapes or non-contact areas between the component parts) beyond a pre-determined level is present between the tile 5 and the shuttle outer shell (not shown), one or more of the sensors will show either high or low pressure, or a high or low pressure relative to their neighboring pressure sensors 21 indicating a contour mismatch. Where a plurality of pressure sensors 21 are utilized, larger variations in pressure between the pressure sensors 21 are indicative of a greater contour mismatch, and smaller or no measurable variations in pressure are indicative of better contour matching.

As described further below, it will be appreciated that variations in responsiveness between the pressure sensors 21 and/or, for example, aging of the pressure sensors 21 whose output may vary with cycling, may affect pressure readings when the components to be measured are test assembled. Thus, as described further below, this system 10 suitably may be pre-calibrated by applying known pressures to the pressure sensors 21.

Figure 2:
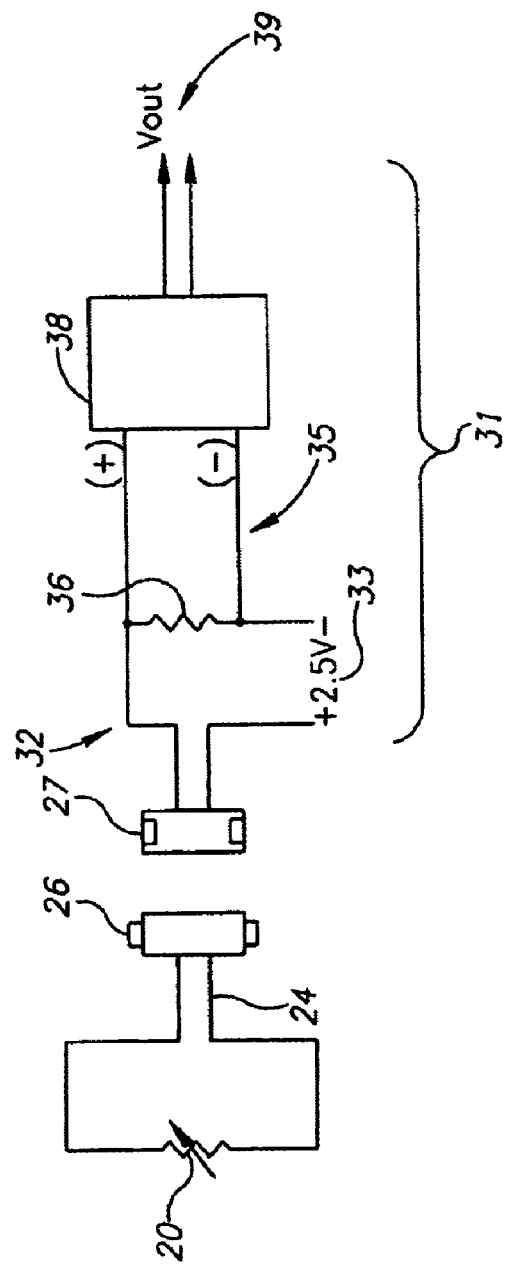
FIG. 2 is a schematic of an exemplary signal conditioning circuit in accordance with another embodiment of the present invention.

FIG. 2 is an exemplary amplifying and conditioning circuit 31 in accordance with an embodiment of the present invention. The conditioning circuit 31 is a single channel conditioner and amplifier such as may form one of the six signal conditioners for a multi-channel conditioner unit 30 such as described in connection with FIG. 1 above. A sensor unit 20 shown as a variable resistor is linked through the wiring harness 24 to a plug 26. The plug 26 suitably mates with a socket 27 linking the sensor unit 20 to the conditioner circuit 31. The plug 26 and the socket 27 suitably couple two conductors per sensor unit 20. A first conductor feeds +2.5 volts from a sensor power source 33 through socket 27 and plug 26 through the wiring harness 24 to the sensor unit 20. A returning voltage varying with the pressure applied to the sensor unit 20 returns through a second conductor through the wiring harness 24 through the plug 26 and the socket 27 to form an input 32 to the conditioner circuit 31. A resistor 36 bridges the input 32 returning from the sensor unit 20 and the −2.5 volt output of the sensor power source 33. Voltage across the resistor 36 is utilized as input to an analog signal conditioning module 38 with feeds 35 leading from opposite ends of the resistor 36 to an analog signal conditioning module 38. The resistor 36 suitably has a resistance of 620 ohms to create a voltage drop of around +/−100 millivolts across the resistor 36 when a 2.5 volt sensor power source 33 is used to power FLEXIFORCE® sensor units 20 for pressures in the 0-3 psi range. Alternately, a 2.0 volt sensor power source 33 may be used with the same 620 ohm resistor 36. Reducing the voltage to 2.0 volts suitably decreases the possibility of saturating the conditioning module 38 with a voltage drop exceeding 100 millivolts.

The module 38 is separately powered (not shown). The module suitably may be a National Instruments Corporation 5B40 analog signal conditioning module for conditioning and amplifying a +/−100 millivolt signal. Output from the operational amplifier is output for further use or display as a voltage out 39 (or $V_{out}$).

It will be appreciated that the signal-conditioning unit 30 of FIG. 1 suitably includes six signal conditioner circuits 31 of FIG. 2, one for each of the five pressure sensors 21 installed on the tile 5. A sixth conditioner circuit 31 with the sensor power source 33 voltage run directly into the conditioner module 38 (without going through a sensor unit 20) provides the $V_{out}$ 39 corresponding to the voltage being provided to the sensor units 20, as mentioned above, as a means of checking for proper voltage to the sensor units 20. The sixth conditioner circuit 31 suitably may include a National Instruments Corporation 5B41 analog signal conditioning module 38 with an input range of +/−10 volts for measuring the 2.5 volt excitation voltage being sent to the sensor units 20. It will be appreciated that a variety of signal conditioning and/or amplifying circuits may be utilized to accommodate a variety of sensors, desired sampling pressures and input voltages. By way of example, but not limitation, input 32 from a sensor unit 20 suitably may be fed into an operational amplifier (or "opamp") circuit prior to output for further processing or display.

Figure 3:
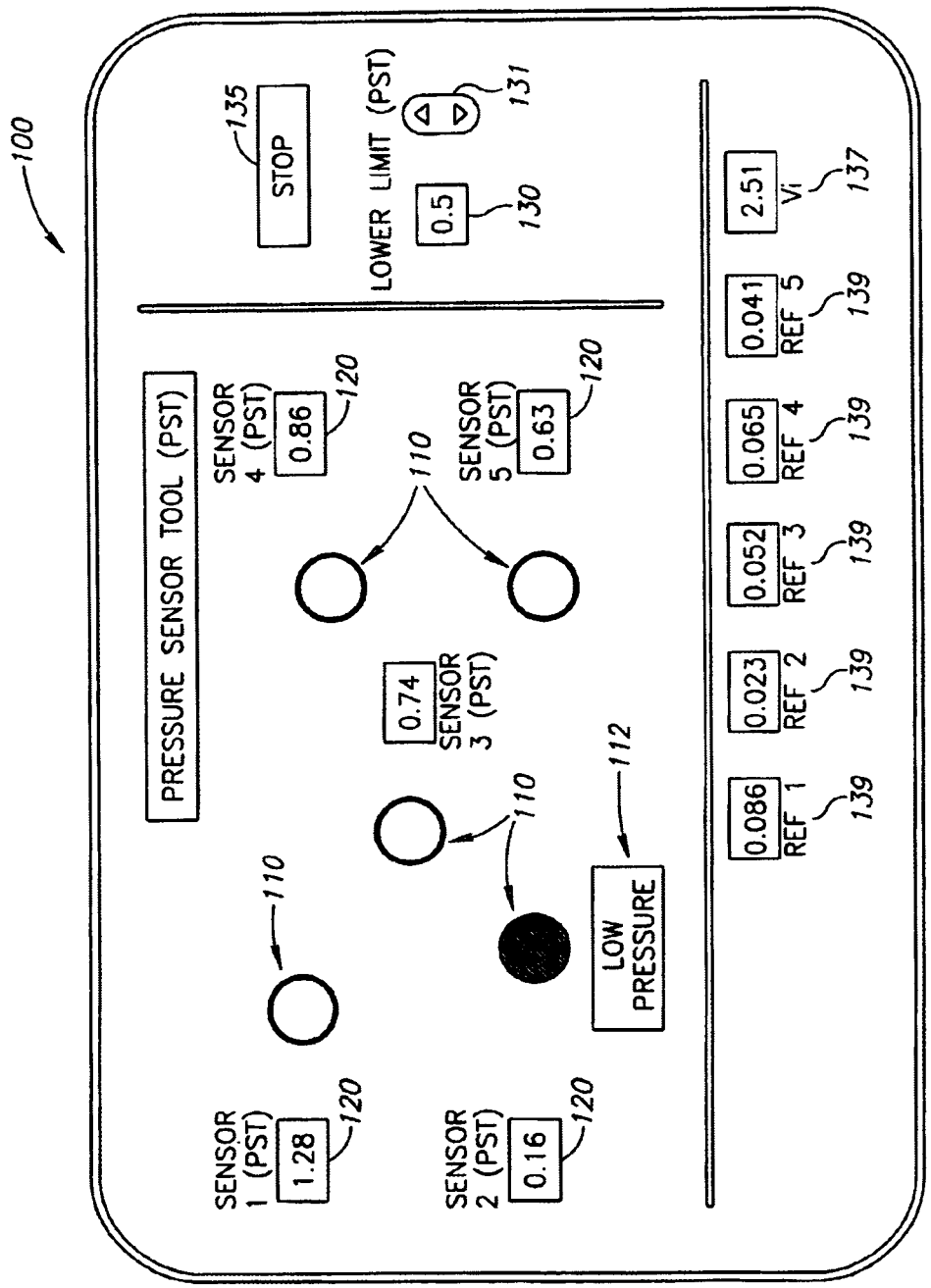
FIG. 3 is a computer screen shot of an exemplary output of an embodiment of the present invention.

FIG. 3 is a screenshot 100 of a computer running an exemplary software receiving contour matching pressure measurements in accordance with an embodiment of the present invention. This screenshot 100 suitably shows output from five pressure sensors 21 (not shown) in a configuration similar to the "5" face of dice, as described with reference to FIG. 1 above. More specifically, indicators 110 are positioned on the screenshot 100 with four in a square. A fifth indicator 110 is positioned in a central location in the center of the square formed by the four other indicators 110. In this embodiment, the screenshot 100 suitably includes indicators 110 that indicate "go" or pass, or "no go" or fail, pressure readings. The indicators, by way of example, may indicate "go" or "no go" conditions by turning green or red respectively, or by darkening if a "no go" to be indicated as shown in FIG. 3.

For each indicator 110, there is also an adjacent numeric display 120 of pressure being sensed by the corresponding pressure sensor 21 (FIG. 1). Each indicator 110 also has a written indicator flasher 112, which in this embodiment includes the words "low pressure" that is displayed when a low-pressure warning for its respective sensor is called for. Calibration steps are described with reference to FIG. 4 below.

The screenshot 100 also displays numerically the lower pressure limit 130 for activation of the indicators 110 for the pressure sensors 21. In this example, the lower limit indicator lower limit setting 130 is set for 0.5 psi. The lower limit setting is suitably adjusted using an up/down adjustment toggle 131 adjacent to the lower limit indicator 130. The up/down lower limit toggle 131 is suitably operated using a computer based pointing device such as a mouse. In this example screenshot 100, pressure from sensor 1 (1.28 psi) is displayed in the upper left-hand corner of a left portion of the screen, sensor 2 (0.16 psi) in the lower left-hand corner of the left portion of the screen, sensor 4 (0.86 psi) in the upper right-hand corner, sensor 5 (0.63 psi) in the lower right-hand corner, and pressure from sensor 3 (0.74 psi) reflecting output from the center pressure sensor is located in the center of the left portion of the screen. With the lower limit indicator 130 set at 0.5 psi, the indicators 110 for sensors 1, 3, 4, 5 are showing a light colored "light" indicating pressures over 0.5 psi, while the indicator 110 for sensor 2 is showing a darker "light" with an adjacent "low pressure" written warning 112 also displayed for sensor 2. Sensor 2 in this example is displaying low pressure in comparison to the other sensors, indicating a mismatch between the component parts being tested by the system.

As mentioned above, it will be appreciated that a low-pressure indication results from a contour mismatch due to a greater space between the component parts in this example at the location of sensor 2 than at the location of the other four sensors. While the component parts may be "rocked" to obtain a higher pressure indication on sensor 1, to do so would lower the pressure on one or more of the other of the sensors still confirming a mismatch. As discussed further below, repeated pressure readings are taken, approximately 6 per second until a stop/start (reading "stop" in this screen shot 100) button 135 is triggered. Thus, it will be appreciated that any inadvertent rocking of the component parts being measured by the system in the present invention will not result in an indication of a predetermined contour match between the component parts.

At a bottom right portion of the screen shot, the sensor output voltages sampled from the five pressure sensors 21 (prior to conversion to pressures) are displayed numerically in five sensor output voltage displays 139. The sensor excitation voltage is also displayed numerically in an adjacent excitation voltage display 137.

Any suitable software may be utilized to take digital information from the pressure sensors 21 (not shown) and display it on the computer screen in a desired fashion, such as the screenshot 100. The screenshot 100 may suitably be generated by a data reduction software program, such as, for example, a display and data reduction program run on the commercially-available product known as LABVIEW, a software system manufactured by National Instruments Corporation, of Austin, Tex.

Figure 4:
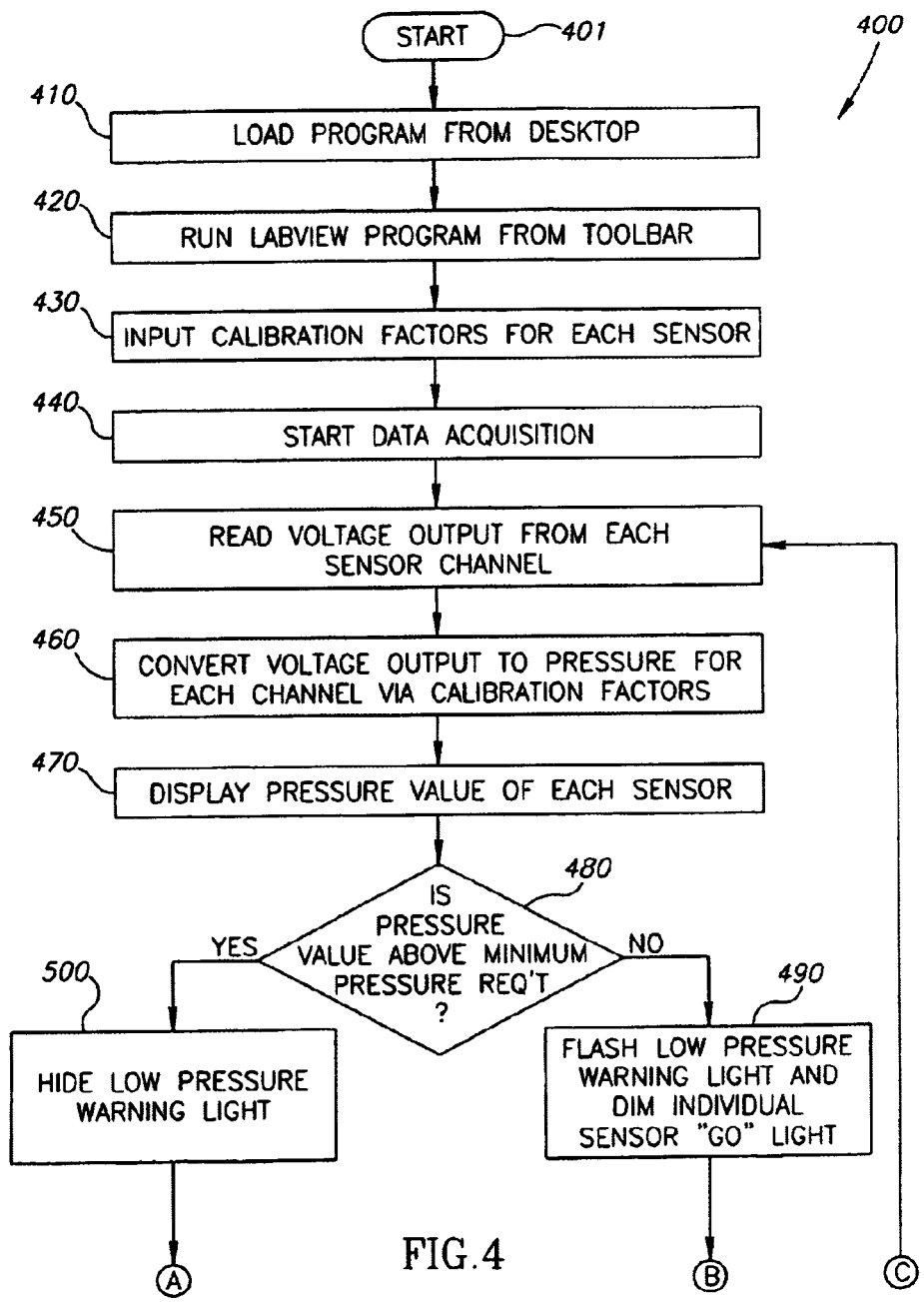
FIG. 4 is a flow chart of a exemplary method of measuring contour matching in accordance with yet another embodiment of the present invention; and, FIG. 5 is a flow chart of an exemplary method of measuring contour matching in accordance with a further embodiment of the present invention.
Figure 4:
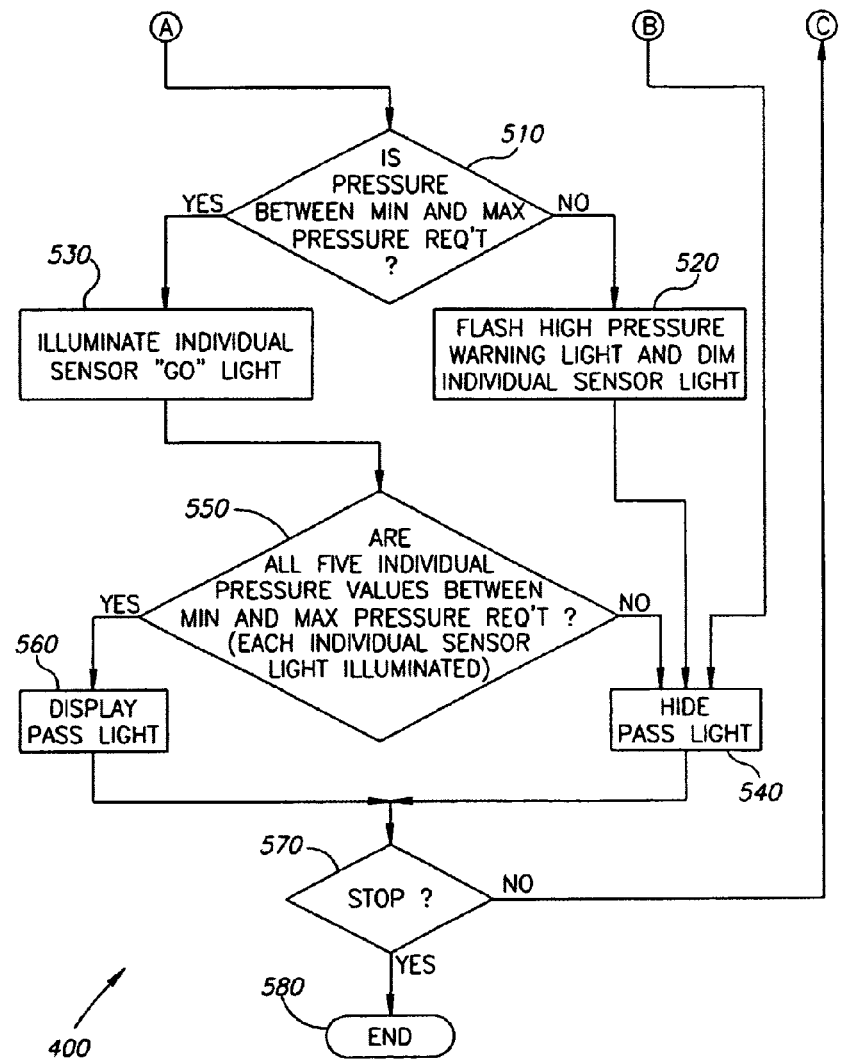

FIG. 4 is a symbolic flowchart of an exemplary method 400 of measuring contour matching in accordance with an embodiment of the present invention. The method 400 starts at a block 401 by powering up the sensor system and the output system including a signal conditioner and a computer, such as described with reference to FIG. 1 above. At a block 410 the data reduction program (e.g. LABVIEW) is loaded from the desktop of the personal computer output device of the present invention. Within the data reduction program at a block 420, a data acquisition, processing, and display program producing a display such as described in connection with FIG. 3 above is run from a toolbar in the data reduction program. At a block 430 calibration factors are input for each sensor. Data may then be acquired at a block 440 by clicking a 'START' button on the display with the mouse.

Calibration at the block 430 suitably may include a variety of calibration techniques. By way of example, if the sensors are uniform and do not age by cycling, time, or other means, calibration may not be desirable and may be eliminated. By way of further example, pressure sensitive ink sensors typically age with repeated pressure cycling, and thus it may be desirable to cycle the sensors a number of times by applying predetermined pressures and then releasing those pressures, prior to calibration. It will be appreciated that depending upon the underlying computer program or circuitry, linear and non-linear responses from the pressure sensors may be accommodated. In an example embodiment, it has been found that applying three predetermined pressures, one at or near the desired pressure level, and two bracketing that pressure level suitably accommodate variations from a linear response in pressure sensitive ink pressure sensors. For example, if 2 psi is the desired pressure, the software may be programmed utilizing the resistance values of each sensor at 1 psi, 2 psi, and 3 psi. Intermediate resistances are then interpolated between the points as if the pressure sensor response curve was a two linear segment curve connecting the pressure/resistance points set by the 1 psi, 2 psi, and 3 psi measurements. Calibration may also be checked during component part testing by applying a known pressure to the sensors.

With continued reference to FIG. 4, after data acquisition is initiated at block 440 by selecting the 'START' button on the display with the mouse, then voltage output is read from each sensor channel at a block 450. At a block 460, the voltage output is converted to pressure for each channel, one channel for each sensor, utilizing the calibration factors previously input at the block 430. At a block 470 the pressure value of each sensor is output through a display. At a block 480 a decision is made as to whether the pressure value is above the minimum pressure required for each sensor. If the pressure value for one or more sensors is below the minimum required, then at a block 490, the low pressure light for that low reading sensor is flashed, and the individual sensor "go" light is dimmed. Then, at a block 540 the "pass" light for the component match is hidden. If the testing is not stopped at a decision block 570 by pressing a "stop" indicator on the software interface, sensor voltages are then reread from the sensors at the block 450. Repeated re-reading of sensor voltages at the block 450 suitably helps the system be sensitive to possible rocking of the component parts, as the sensor indicators do not latch in a "pass" or "fail" condition.

If, however, the determination at block 480 reveals that the pressure value for each sensor is above the minimum required, then at a block 500, the low pressure warning light is hidden for each such sensor whose pressure value is above the minimum pressure requirement. Next, a decision is made at a block 510 as to whether the pressure value is between a minimum and maximum pressure requirement. If the pressure value for a sensor is not between the minimum and maximum pressure requirement, in this exemplary embodiment, at a block 520 a high pressure warning light is flashed and the individual sensor "go" light for that sensor is dimmed. The "pass" light for the component is then dimmed at the block 540 reflecting that the component does not exhibit the desired contour match. If the testing is not stopped at the decision block 570, sensor voltages are then reread from the sensors at the block 450. If the test is stopped the testing ends at a block 580.

As further shown in FIG. 4, if the pressure value for a sensor is between the maximum and minimum pressure requirement at block 510, then at a block 530 a "go" light for each such sensor is lit. At a block 550, an evaluation is made as to whether all of the individual pressure values are between the maximum and minimum pressure requirement. In this example embodiment, without limitation, there are the five individual pressure values. If all 5 meet the pressure requirements, the component passed, and a "pass" light is displayed at a block 560. If any of the 5 sensors, in this embodiment, are not showing individual pressure values between the maximum and minimum required, the component fails, and the "pass" light is hidden at the block 540 described above. After the "pass" light is displayed at the block 560 or after the "pass" light is hidden at block 540, or at any time if desired, the testing may be stopped at the decision block 570 by clicking the "stop" button on the software display. If the test is completed the testing ends at the block 580. If testing is not stopped, voltages are again read from the sensors at the block 450.

Figure 5:
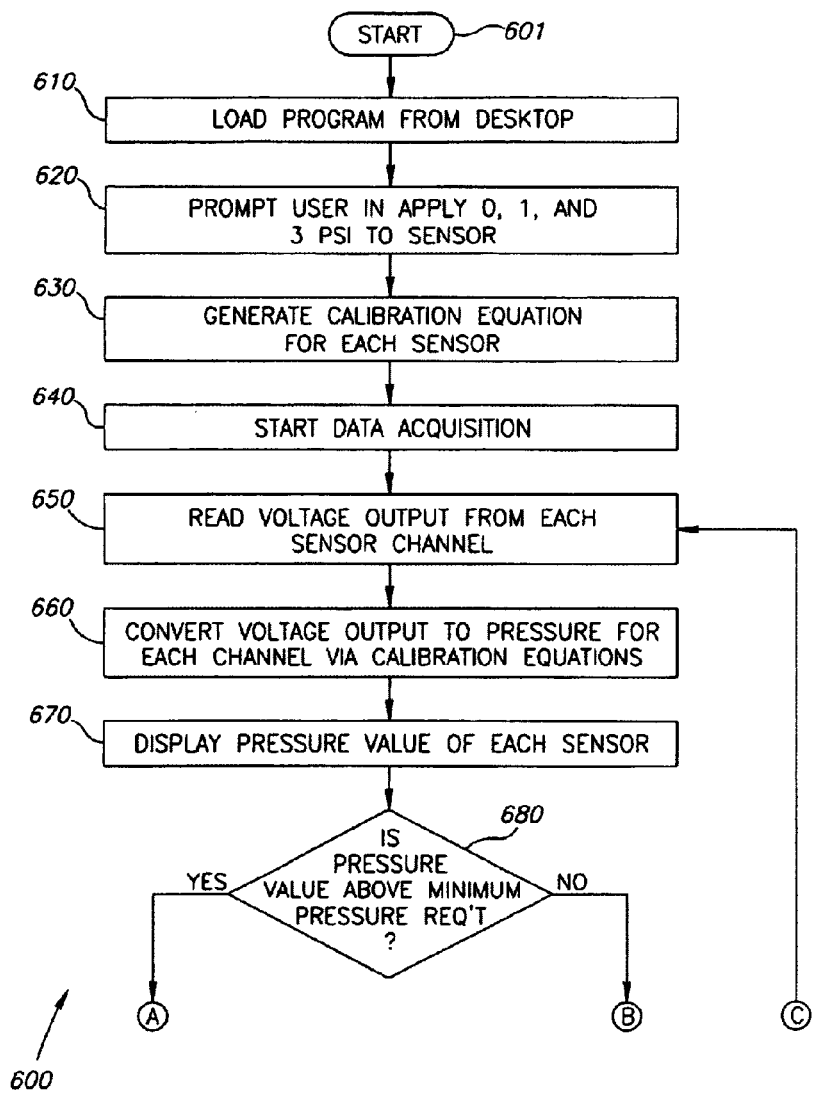
Figure 5:
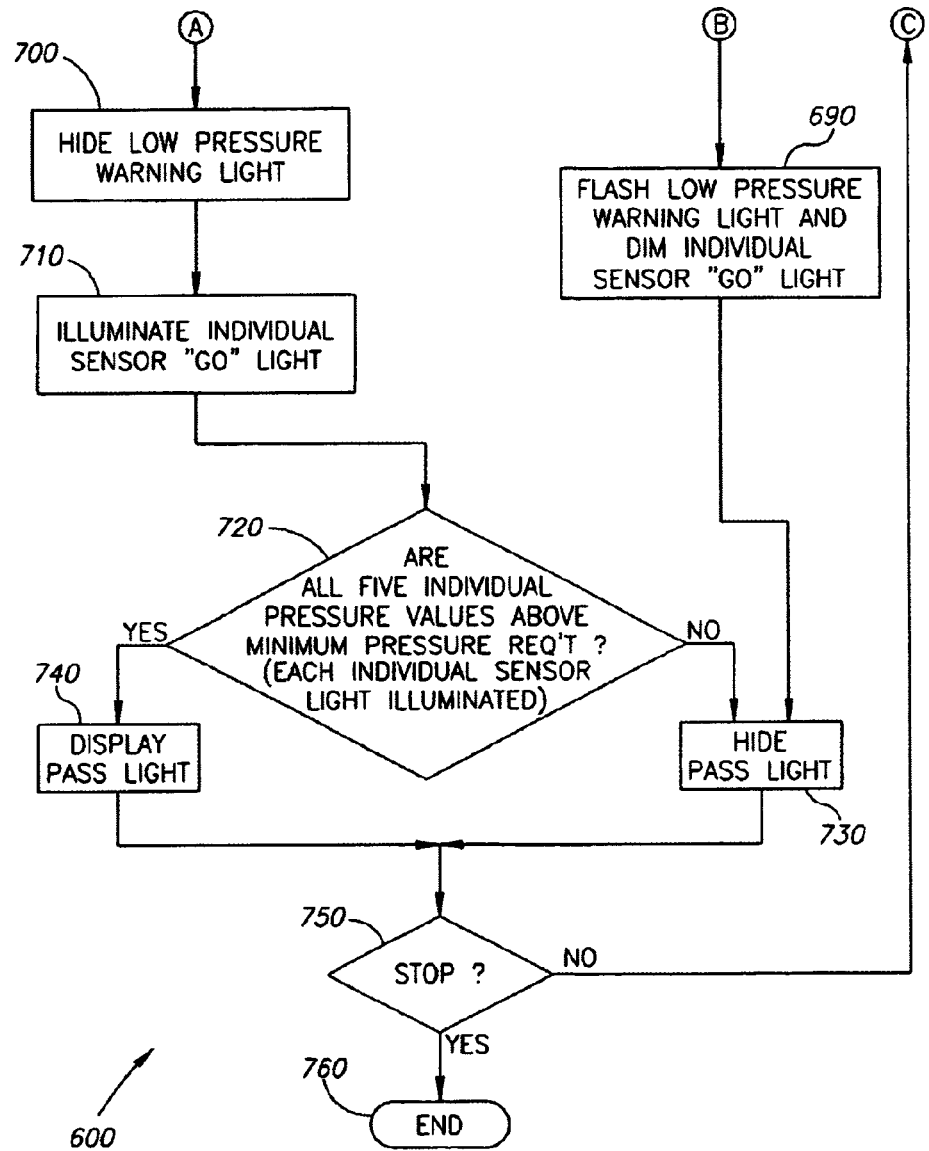

It will be appreciated that if the pressure applied between two components being checked for contour matching is predetermined, that a high pressure reading on one sensor usually means another sensor will read a low pressure, depending upon the sensor layout on the component. Thus, for some embodiments of the present invention, it may be suitable to display and sample only for minimum pressure readings from the sensors, and not analyze or include displays for high pressure readings from the sensors. For example, FIG. 5 is a flow chart of a method 600 of measuring contour matching between components checking for low pressure readings in accordance with yet another embodiment of the present invention. At a block 601 the method is started, typically by powering up the sensors, signal conditioner unit if used, and an attached computer. At a block 610 a data acquisition, processing, and display program is loaded from the computer desktop. At a block 620 the user is prompted to apply known pressures, in this example, 0.0, 1.0, and 3.0 psi to each individual sensor. At a block 630 the display and voltage conversion program generates calibration equations (voltage/pressure curves) for each sensor from the application of the known pressures. At a block 640 data acquisition is started with the component parts being measured in contact with each other with sensors in between. At a block 650 voltage output is read from each sensor channel. At a block 660 the voltage output is converted to pressure for each channel (i.e. for each sensor) using the calibration equations previously generated at the block 630. At a block 670 the pressure value of each sensor is displayed. At a block 680 a decision is made as to whether the pressure value for each sensor is above the minimum pressure required. For each sensor, if the pressure is not above the minimum required, at a block 690 the "low pressure light" is flashed and the individual sensor "go" light is dimmed. If a sensor is reading low pressure at a block 730 the "pass" light is hidden as at least one of the individual sensors is showing a low pressure. If testing is not stopped at a decision block 750 by clicking the 'stop' button on the software interface, voltages are again read from the sensors at block 650. It will be appreciated that in this example embodiment, the testing may be stopped at any time by clicking the 'stop' button on the software interface. If the test is stopped the testing ends at a block 760.

If, however, the pressure value for an individual sensor at the block 680 is above the minimum pressure requirement, then at a block 700, the "low pressure" warning light for that sensor is hidden. At a block 710 the individual sensor "go" light or indicator is lit. At a block 720 a cross check is made to determine that, in this example embodiment, all five individual pressure values for the five sensors used are above the minimum pressure requirement. If all five individual pressure values are not above the minimum the process proceeds to block the block 730 where the "pass" light is hidden. If all five individual pressure values are above the minimum then the "pass" light reflecting an acceptable component contour match is lit at a block 740. After hiding or lighting the "pass" light at blocks 730 or 740, respectively, or at any other desired time, the test may be terminated at a decision block 750 by clicking the 'stop' button on the software interface. If the test is completed, the testing ends at a block 760. If testing is not stopped, voltages are again read from the sensors at block 650. It will be also appreciated that the method of the present invention suitably may utilize a varying number of sensors other than five sensors as described with reference to FIGS. 4 and 5 above.

While various alternate and preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A system for measuring a contour match between adjacent components, the system comprising:
   at least two pressure sensors spaced apart by a predetermined distance and adapted to be compressed between the adjacent components as at least one of the adjacent components is moved towards the other, each of the at least two pressure sensors arranged to obtain simultaneously a pressure measurement at a predetermined distance away from the other of the at least two pressure sensors and to output the pressure measurement; and
   an output device adapted to receive the pressure measurements from the at least two pressure sensors and to output the pressure measurements, wherein the output device comprises a plurality of channels including a first channel adapted to condition and amplify a base excitation voltage transmitted to the at least two pressure sensors, and a set of other channels adapted to condition and amplify the pressure measurements.

2. The system of claim 1, wherein the at least two pressure sensors include flexible thin film pressure sensors.

3. The system of claim 1, wherein the at least two pressure sensors include pressure sensitive ink pressure sensors.

4. The system of claim 1, wherein the at least two pressure sensors include a first pressure sensor, a second pressure sensor spaced apart from the first pressure sensor, and a third pressure sensor disposed between the first and second pressure sensors.

5. The system of claim 1, wherein the at least two pressure sensors include first, second, third, and fourth pressure sensors spaced apart to form a quadrilateral, and a fifth pressure sensor positioned within the quadrilateral.

6. The system of claim 1, wherein the output device includes an amplifying and conditioning circuit having a sensor unit adapted to receive the pressure measurements, a power source operatively coupled to the sensor unit, and an amplifier coupled to the sensor unit.

7. The system of claim 1, wherein the output device includes a computer.

8. A system for measuring a contour match between adjacent components, the system comprising:
   at least five pressure sensors adapted to be compressed between the adjacent components, each pressure sensor adapted to obtain a pressure measurement a predetermined distance away from the other of the at least five pressure sensors and to output the pressure measurement, wherein four of the pressure sensors are adapted to obtain pressure measurements proximal to a perimeter of at least one of the adjacent components, and another of the pressure sensors is adapted to obtain a pressure measurement at an intermediate position within the perimeter; and,
   an output device adapted to simultaneously receive the pressure measurements from the at least five pressure sensors and to output the pressure measurements, wherein the output device comprises a plurality of channels including a first channel adapted to condition and amplify a base excitation voltage transmitted to the at least five pressure sensors, and a set of other channels adapted to condition and amplify the pressure measurements.

9. The system of claim 8, wherein the at least five pressure sensors include flexible thin film pressure sensors.

10. The system of claim 8, wherein the at least five pressure sensors include pressure sensitive ink pressure sensors.

11. The system of claim 8, wherein the locations of the four pressure sensors form a quadrilateral, and the position of the other pressure sensor is approximately centrally located within the quadrilateral.

12. The system of claim 8, wherein the output device includes an amplifying and conditioning circuit having a sensor unit adapted to receive the pressure measurements, a power source operatively coupled to the sensor unit, and an amplifier coupled to the sensor unit.

13. The system of claim 8, wherein the output device includes a computer.

* * * * *